(12) United States Patent
Nagano et al.

(10) Patent No.: US 7,371,013 B2
(45) Date of Patent: May 13, 2008

(54) LASER APPARATUS AND METHODS FOR ASSEMBLING AND INSTALLING THE SAME

(75) Inventors: Kazuhiko Nagano, Kanagawa-ken (JP); Yuichi Teramura, Kanagawa-ken (JP); Akihiro Hashiguchi, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/384,504

(22) Filed: Mar. 21, 2006

(65) Prior Publication Data

US 2006/0215966 A1 Sep. 28, 2006

(30) Foreign Application Priority Data

Mar. 22, 2005  (JP) .............................. 2005-082179

(51) Int. Cl.
*G02B 6/42* (2006.01)
(52) U.S. Cl. .......................................... 385/89; 385/89
(58) Field of Classification Search ............. 385/88–94
See application file for complete search history.

(56) References Cited

U.S. PATENT DOCUMENTS 5,195,155 A * 3/1993 Shimaoka et al. ............ 385/90

6,995,912 B2    2/2006  Okazaki et al.
2004/0052478 A1* 3/2004  Minamino et al. ............ 385/91
2004/0247011 A1* 12/2004 Okazaki et al. ............. 372/108

FOREIGN PATENT DOCUMENTS

EP              0631164 A1    12/1994
JP          2004-45667 A       2/2004

\* cited by examiner

*Primary Examiner*—Sarah Song
(74) *Attorney, Agent, or Firm*—Sughrue Mion, PLLC

(57) ABSTRACT

A method for assembling a laser apparatus which condenses a laser beam and couples the laser beam to an optical fiber. After the optical fiber is fixed to a package, the whole or a part of an optical condensing system is fixed to the package through a fixing structure having at least one guide surface extending in at least one of first and second directions respectively parallel and perpendicular to the core axis of the optical fiber, by moving the whole or the part of the optical condensing system along the at least one guide surface to a predetermined position with respect to the core axis, and fixing the whole or the part of the optical condensing system to the fixing structure at the predetermined position.

12 Claims, 8 Drawing Sheets

LASER APPARATUS AND METHODS FOR ASSEMBLING AND INSTALLING THE SAME

BACKGROUND OF THE INVENTION

1. Field of the Invention

The present invention relates to a laser apparatus in which one or more laser beams emitted from one or more semiconductor lasers contained in a package are optically combined in an optical fiber. The present invention also relates to a method for assembling the above laser apparatus, and to a structure for installing the above laser apparatus in a system which uses the laser apparatus.

2. Description of the Related Art

Some known types of laser apparatuses optically combine a plurality of laser beams in a single optical fiber, and output a high-power laser beam by inputting the plurality of laser beams into the single optical fiber. For example, such laser apparatuses are disclosed in U.S. Pat. No. 6,995,912 and Japanese Unexamined Patent Publication No. 2004-045667. The disclosed laser apparatuses are basically constituted by one or more semiconductor lasers which emit a plurality of laser beams, a single optical fiber, and an optical condensing system which condenses the plurality of laser beams and couples the condensed laser beams to the optical fiber.

In addition, in another known type of laser apparatus, a laser beam emitted from a single semiconductor laser is condensed by an optical condensing system, and is then coupled to an optical fiber. For example, such a laser apparatus is disclosed in European Patent Publication No. 0631164.

In many of the above types of laser apparatuses, the optical condensing systems and the semiconductor lasers are hermetically sealed in a package for prevention of contamination. In the case where such a package is used, a light-entrance end of the optical fiber is held in the package in such a manner that the light-entrance end faces the optical condensing system. In a conventionally known structure for holding the optical fiber as above, the optical fiber is simply fixed to a sidewall or the like of the package with a brazing material or an adhesive, as disclosed in Japanese Unexamined Patent Publication No. 2004-045667. Further, European Patent Publication No. 0631164 discloses a technique wherein a mechanism for adjustment of the position of a ferrule holding the optical fiber is arranged in advance at a sidewall of the package, where the mechanism enables adjustment of the position of the ferrule in the direction of the core axis and the direction perpendicular to the core axis, so that the optical fiber can be set at an optimum position with respect to the optical condensing system by using the above mechanism before the ferrule is fixed to the package.

However, in the structure for holding the optical fiber disclosed in Japanese Unexamined Patent Publication No. 2004-045667, no further provision is made for optimumly positioning the optical condensing system with respect to the optical fiber fixed to the package. Therefore, the operation for aligning the optical fiber with the optical condensing system is not easy.

On the other hand, in the structure for holding the optical fiber disclosed in European Patent Publication No. 0631164, the operation for aligning the optical fiber with the optical condensing system is easy. However, in this structure, the aforementioned mechanism for adjusting the ferrule which holds the optical fiber is provided in advance at the sidewall of the package. Therefore, the overall size of the package becomes great.

SUMMARY OF THE INVENTION

The present invention has been developed in view of the above circumstances.

The first object of the present invention is to provide a laser apparatus which can be compactly constructed, and in which position alignment between an optical fiber and an optical condensing system can be adjusted with high reliability.

The second object of the present invention is to provide a method for assembling a laser apparatus by which position alignment between an optical fiber and an optical condensing system can be easily adjusted.

The third object of the present invention is to provide an installation structure for installing the laser apparatus which accomplishes the first object, in a system which uses the laser apparatus, while maintaining the precision of the position alignment between the optical fiber and the optical condensing system.

(I) In order to accomplish the above first object, in the laser apparatus according to the present invention, a fixing structure for fixing an optical condensing system in a package is arranged so that the whole or a part of the optical condensing system can be moved along at least one guide surface before the whole or the above part of the optical condensing system is fixed. Therefore, position alignment between the optical condensing system and the optical fiber can be adjusted by moving the whole or the part of the optical condensing system, and the optical fiber is merely required to be fixed to the package.

Specifically, according to the first aspect of the present invention, there is provided a laser apparatus comprising: one or more semiconductor lasers which emit one or more laser beams; an optical fiber; an optical condensing system which condenses the one or more laser beams emitted from the one or more semiconductor lasers, and makes the one or more laser beams enter the optical fiber from a light-entrance end of the optical fiber; a package which contains the optical condensing system and the one or more semiconductor lasers, and fixedly holds the optical fiber in such a manner that the light-entrance end of the optical fiber faces the optical condensing system; and a fixing structure which is arranged between the optical condensing system and the package for fixing the whole or a part of the optical condensing system to the package through the fixing structure, has at least one guide surface extending in at least one of first and second directions respectively parallel and perpendicular to a core axis of the optical fiber at the light-entrance end, and allows movement of the whole or the part of the optical condensing system along the at least one guide surface before fixing the whole or the part of the optical condensing system to the package.

Preferably, the laser apparatus according to the first aspect of the present invention may also have one or any possible combination of the following additional features (i) to (iv).

(i) The fixing structure comprises a mount which is fixed to the package and has a holder-attachment surface perpendicular to the core axis, and a holder which is fixed to the holder-attachment surface and has an optical-system mounting surface arranged parallel to the core axis for mounting the whole or the part of the optical condensing system.

(ii) The one or more semiconductor lasers emit a plurality of laser beams.

(iii) The optical fiber is fixed to the package with one of a brazing material and an adhesive.

(iv) The laser apparatus according to the first aspect of the present invention may further comprise a ferrule which is arranged for fixing the optical fiber, and is integrally formed with the package.

(II) In order to accomplish the aforementioned second object, the second aspect of the present invention is provided. According to the second aspect of the present invention, there is provided a method for assembling the laser apparatus according to the first aspect of the present invention. The method comprises the steps of: (a) fixing the optical fiber to the package; (b) adjusting the whole or the aforementioned part of the optical condensing system to a predetermined position with respect to the core axis by moving the whole or the part of the optical condensing system along the at least one guide surface of the fixing structure; and (c) fixing the whole or the part of the optical condensing system to the fixing structure at the predetermined position.

In addition, in order to accomplish the aforementioned second object, the third aspect of the present invention is also provided. According to the third aspect of the present invention, there is provided a method for assembling the laser apparatus according to the first aspect of the present invention having the aforementioned additional feature (i). The method comprises the steps of: (a) fixing the optical fiber to the package; (b) adjusting the aforementioned holder to a first predetermined position in a first direction perpendicular to the core axis by moving the holder on the holder-attachment surface of the mount fixed to the package; (c) fixing the holder to the holder-attachment surface at the first predetermined position; (d) adjusting the whole or the aforementioned part of the optical condensing system to a second predetermined position in a second direction parallel to the core axis by moving the whole or the part of the optical condensing system on the optical-system mounting surface of the holder fixed to the mount; and (e) fixing the whole or the part of the optical condensing system to the optical-system mounting surface at the second predetermined position.

(III) In order to accomplish the aforementioned third object, the fourth aspect of the present invention is provided. According to the fourth aspect of the present invention, there is provided an installation structure for installing the laser apparatus according to the first aspect of the present invention in a system using the laser apparatus and having a main body. The installation structure comprises: a package-mounting member having a mounting surface on which the package of the laser apparatus is placed, and being directly or indirectly fixed to the main body; and an elastic member elastically pressing the package against the mounting surface.

Preferably, in the installation structure according to the fourth aspect of the present invention, the package-mounting member has a temperature-control function which realizes temperature control of the laser apparatus, and the package is placed in direct contact with the mounting surface without insertion of a heat-insulating member.

(IV) The first to fourth aspects of the present invention have the following advantages.

In the method according to the second aspect of the present invention, after the optical fiber is fixed to the package, the whole or a part of the optical condensing system is adjusted to a predetermined position with respect to the core axis of the optical fiber by moving the whole or the part of the optical condensing system along the at least one guide surface of the fixing structure. Therefore, the position of the whole or the part of the optical condensing system can be easily adjusted.

In addition, the laser apparatus according to the first aspect of the present invention has a fixing structure which allows movement of the whole or a part of the optical condensing system along the at least one guide surface before fixing the whole or the part of the optical condensing system to the package. Therefore, the laser apparatus according to the first aspect of the present invention allows use of the method according to the second aspect of the present invention, and facilitates the adjustment of the position of the optical condensing system by the method according to the second aspect of the present invention.

Further, since the position alignment between the optical fiber and the optical condensing system can be adjusted by movement of the optical condensing system in the package, the optical fiber is merely required to be fixed to the package. In other words, it is unnecessary to provide a mechanism for positioning the optical fiber outside the package. Therefore, it is possible to reduce the size of the laser apparatus.

In particular, in the case where the fixing structure comprises a mount which is fixed to the package and has a holder-attachment surface perpendicular to the core axis, and a holder which is fixed to the holder-attachment surface and has an optical-system mounting surface arranged parallel to the core axis for mounting the whole or a part of the optical condensing system, the fixing structure is extremely simple.

Furthermore, in the case where the one or more semiconductor lasers emit a plurality of laser beams, higher precision is required in the position alignment between the optical fiber and the optical condensing system than in the case where only a single laser beam is condensed and coupled to the optical fiber. However, since the operation for the position adjustment of the optical condensing system is facilitated by the present invention, the above higher precision can be more easily realized.

As mentioned before, the construction for holding the optical fiber in the laser apparatus according to the first aspect of the present invention can be simplified, i.e., the optical fiber can be simply fixed to the package. However, if the optical fiber in such a construction is prone to displacement, the precision in the fixed position of the optical condensing system becomes meaningless. Even when the displacement of the optical fiber is approximately one micrometer, the coupling efficiency of the laser beam(s) with the optical fiber and the power of the laser beam outputted from the optical fiber are lowered.

The installation structure according to the fourth aspect of the present invention is provided in consideration of the above circumstances. Since the installation structure according to the fourth aspect of the present invention comprises a package-mounting member having a mounting surface on which the package of the laser apparatus is placed, and being directly or indirectly fixed to the main body, and an elastic member elastically pressing the package against the mounting surface, it is possible to effectively suppress the distortion which propagates through the package to the portion at which the optical fiber is fixed, in comparison with the conventional installation structure in which the bottom surface of the package is screw-fixed to a main body of a system which uses the laser apparatus. Therefore, in the case where the installation structure according to the fourth aspect of the present invention is used, it is possible to effectively prevent displacement of the optical fiber caused by the distortion occurring at the time of installation although the construction for fixing the optical fiber is simplified.

In the case where the package-mounting member has a temperature-control function which realizes temperature control of the laser apparatus, if a heat-insulating member is inserted between the package-mounting member and the package of the laser apparatus, the package is prone to distortion caused by heat distortion of the heat-insulating member which occurs when the temperature changes. On the other hand, in the case where the package is placed in direct contact with the mounting surface without insertion of a heat-insulating member, it is possible to reliably prevent occurrence of distortion of the package caused by the heat distortion of the heat-insulating member, and lowering of the coupling efficiency of the laser beam caused by displacement of the optical fiber which is produced by the distortion of the package.

DESCRIPTION OF PREFERRED EMBODIMENTS

Preferred embodiments of the present invention are explained in detail below with reference to drawings.

Construction of Laser Apparatus

Figure 1:
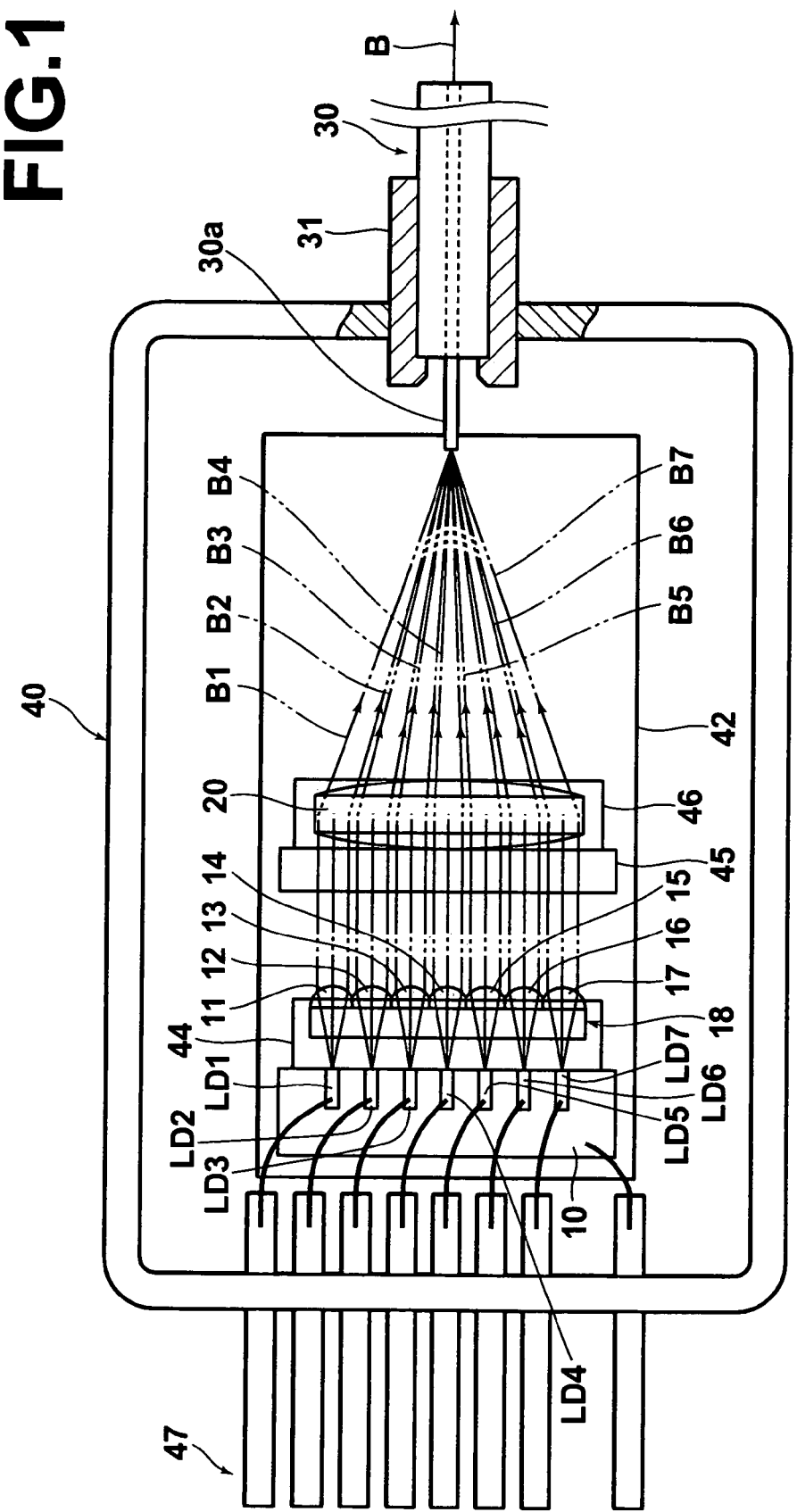
FIG. 1 is a plan view, partly in cross section, of a laser apparatus according to an embodiment of the present invention.
Figure 2:
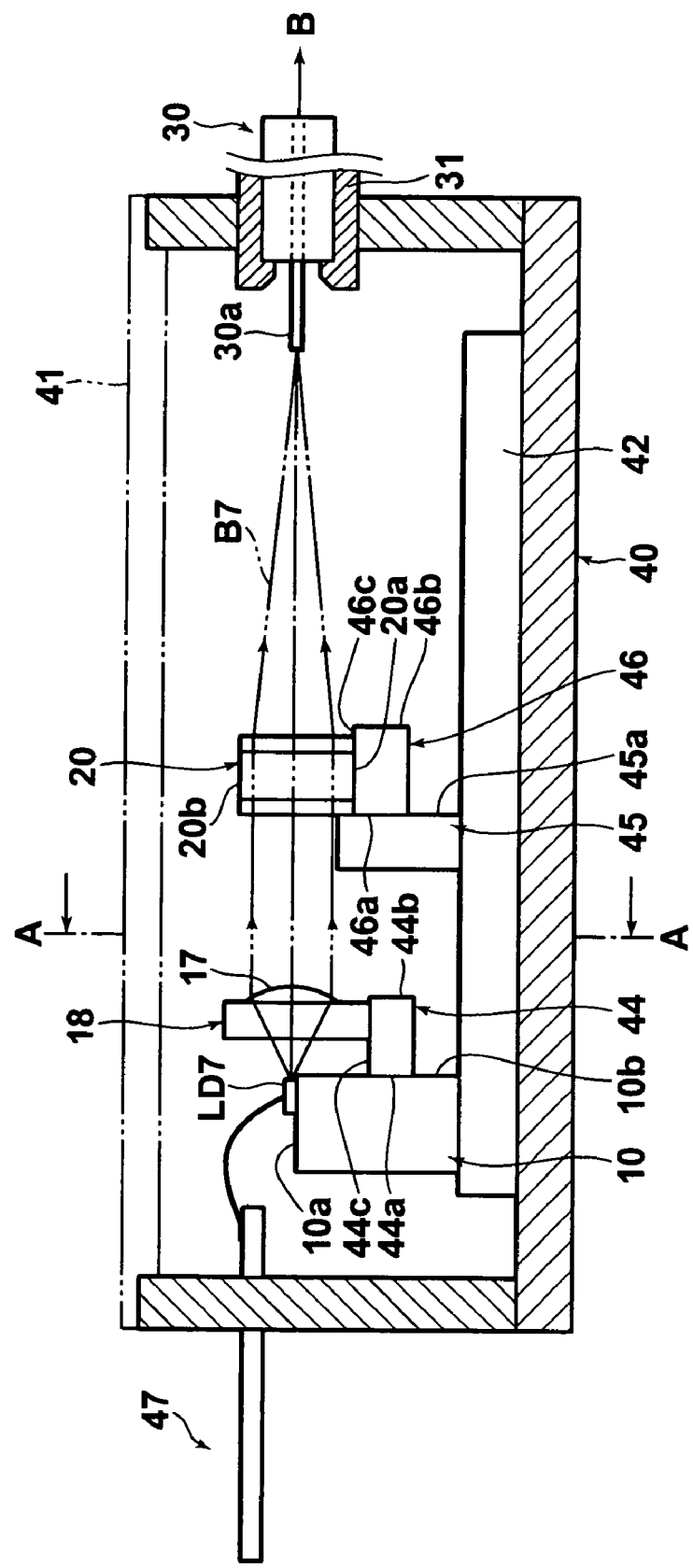
FIG. 2 is a side view, partly in cross section, of the laser apparatus according to the embodiment.
Figure 3:
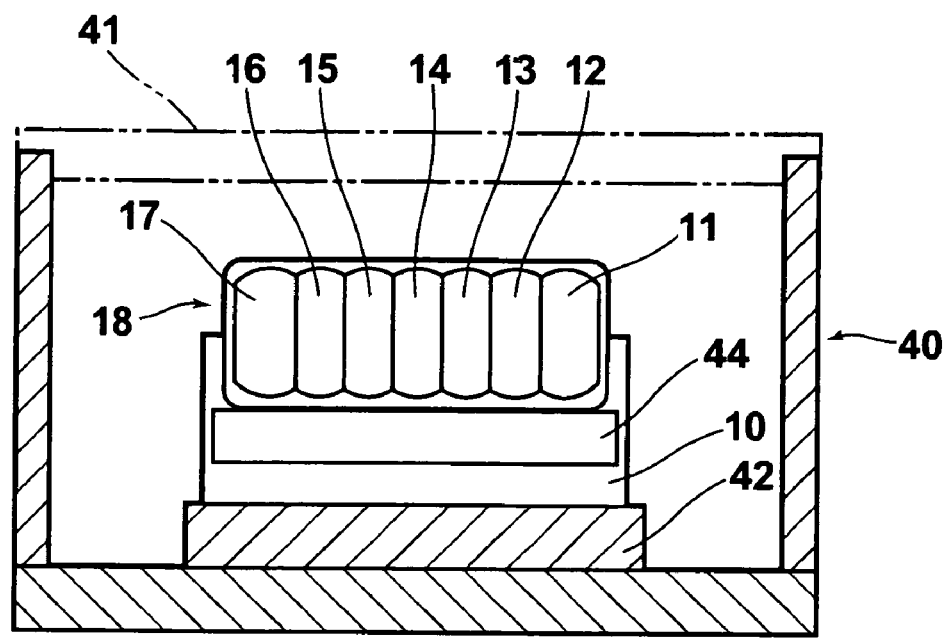
FIG. 3 is a front view of a rear half of the laser apparatus according to the embodiment which is cut at a cross section.

FIGS. 1 and 2 are respectively plan and side views, partly in cross section, of a laser apparatus according to an embodiment of the present invention, and FIG. 3 is a front view of a rear half of the laser apparatus which is cut at the cross section A-A indicated in FIG. 2. The laser apparatus according to the present embodiment is a high-luminosity combined-ultraviolet-light laser apparatus (which may be hereinafter referred to as a combined laser apparatus or a laser-light source).

As illustrated in FIGS. 1, 2, and 3, the laser apparatus according to the present embodiment comprises a plurality (e.g., seven) of GaN-based semiconductor laser chips LD1, LD2, LD3, LD4, LD5, LD6, and LD7, a collimator-lens array 18, a condensing lens 20, and a multimode optical fiber 30. The GaN-based semiconductor lasers LD1 through LD7 are arrayed on and fixed to a heat block 10, which has high thermal conductivity. In the collimator-lens array 18, a plurality of collimator lenses 11 through 17 respectively corresponding to the GaN-based semiconductor lasers LD1 through LD7 are integrally formed.

For example, all the GaN-based semiconductor lasers LD1 through LD7 have an oscillation wavelength of 405 nm and a maximum output power of 300 mW. The GaN-based semiconductor lasers LD1 through LD7 oscillate in multiple transverse modes. Alternatively, it is possible to use single-mode semiconductor lasers.

The laser beams B1 through B7 are emitted from the GaN-based semiconductor lasers LD1 through LD7 as divergent beams. Then, the divergent laser beams B1 through B7 are respectively collimated by the collimator lenses 11 through 17 in the collimator-lens array 18. FIG. 3 shows the collimator-lens array 18 viewed from the cross section A-A indicated in FIG. 2.

The collimated laser beams B1 through B7 are condensed by the condensing lens 20, and converge on an light-entrance end face of the core 30a of the multimode optical fiber 30. In this embodiment, the collimator lenses 11 through 17 and the condensing lens 20 constitute an optical condensing system, and the optical condensing system and the multimode optical fiber 30 constitute an optical combining system. That is, the laser beams B1 through B7 condensed by the condensing lens 20 enter the core 30a of the multimode optical fiber 30, propagate through the core 30a, and are optically combined into a single laser beam B, so that the laser beam B is outputted from the multimode optical fiber 30. The multimode optical fiber 30 may be a step-index type, a graded-index type, or a composite-type optical fiber. In the composite-type optical fiber, the functions of the step-index type optical fiber and the graded-index type optical fiber are combined.

The optical components constituting the laser apparatus according to the present embodiment are contained in a box type package 40. The package 40 has an opening on its upper side, and is provided with a cover 41, so that the opening of the package 40 can be closed with the cover 41. Thus, when the opening of the package 40 is closed with the cover 41, the optical components are held in a closed and hermetically sealed space enclosed by the package 40 and the cover 41. A near-end portion of the multimode optical fiber 30 on the light-entrance side is held in a ferrule 31, and fixed to a sidewall of the package 40.

A base plate 42 is fixed on the bottom surface of the package 40, the aforementioned heat block 10 is attached on the upper surface of the base plate 42, the GaN-based semiconductor lasers LD1 through LD7 are fixed on an upper face 10a of the heat block 10, and a collimator-lens holder 44 for holding the collimator-lens array 18 is fixed on a front face 10b of the heat block 10. In addition, a mount 45 for fixing a lens is fixed on the upper surface of the base plate 42, and a condensing-lens holder 46 for holding the condensing lens 20 is fixed on a front face 45a of the mount 45. Further, wirings 47 for supplying driving currents to the GaN-based semiconductor lasers LD1 through LD7 are led out of the package 40 through an opening formed in a sidewall of the package 40.

As illustrated in FIG. 3, each of the collimator lenses 11 through 17 in the collimator-lens array 18 has a shape obtained by cutting out an elongated portion of an aspherical round lens so that the portion contains the optical axis of the aspherical round lens. For example, the collimator-lens array 18 can be formed by molding from optical glass. The collimator lenses 11 through 17 have a first aperture diameter in a first direction and a second aperture diameter in a second direction perpendicular to the first direction, and the second aperture diameter is greater than the first aperture diameter, where the light-emission points of the GaN-based semiconductor lasers LD1 through LD7 are arrayed along the first direction (i.e., the horizontal direction in FIG. 3), and the second direction corresponds to the vertical direction in FIG. 3. Thus, the collimator lenses 11 through 17 are closely arranged in the direction along which the light-emission points of the GaN-based semiconductor lasers LD1 through LD7 are arrayed.

Each of the GaN-based semiconductor lasers LD1 to LD7 has an emission width of about 2 micrometers. For example, the spread angle of each of laser beams B1 through B7 emitted from the GaN-based semiconductor lasers LD1 to LD7 is 10 degrees in the direction parallel to the active layer and 30 degrees in the direction perpendicular to the active layer. The light-emission points of the GaN-based semiconductor lasers LD1 to LD7 are arranged along a line parallel to the active layers of the GaN-based semiconductor lasers LD1 to LD7.

Therefore, the laser beams B1 through B7 emitted from the GaN-based semiconductor lasers LD1 to LD7 enter the collimator lenses 11 through 17 in such a manner that the direction of the greater spread angle of each of the laser beam B1 through B7 coincides with the direction of the greater aperture diameter of each of the collimator lenses 11 through 17, and the direction of the smaller spread angle of each of the laser beam B1 through B7 coincides with the direction of the smaller aperture diameter of each of the collimator lenses 11 through 17. That is, the elongated shapes of the collimator lenses 11 through 17 correspond to the elliptical cross-sectional shapes of the laser beams B1 through B7 which enter the collimator lenses 11 through 17, so that the noneffective portions of the collimator lenses 11 through 17 are minimized. In this example, the effective aperture diameter of each of the collimator lenses 11 through 17 is 1.1 mm in the horizontal direction, and 3.6 mm in the vertical directions, and the beam diameter of each of the laser beam B1 through B7 is 0.9 mm in the horizontal direction and 2.6 mm in the vertical direction. In addition, each of the collimator lenses 11 through 17 has a focal length (f1) of 3 mm and a numerical aperture (NA) of 0.6, and the collimator lenses 11 through 17 are arranged with a pitch of 1.2 mm.

The condensing lens 20 has a shape which is obtained by cutting an aspherical round lens so as to leave an elongated portion containing the optical axis of the aspherical round lens. Thus, the condensing lens 20 is elongated in the horizontal direction (along which the collimator lenses 11 through 17 are arranged, and has a small dimension in the vertical direction (perpendicular to the direction along which the collimator lenses 11 through 17 are arranged). The condensing lens 20 has a focal length (f2) of 23.15 mm and a magnification power of 7.7. The condensing lens 20 and the aforementioned collimator-lens array 18 can be formed by molding from optical glass or synthetic resin.

For example, the multimode optical fiber 30 is a step-index type optical fiber having a core diameter of 60 micrometers and a numerical aperture (NA) of 0.23. In addition, the transmittance of the end face coating is 99.5%, and the internal loss is 98.5%.

In this example, the coupling efficiency of the collimated laser beams B1 through B7 to the multimode optical fiber 30 is 0.9. Therefore, when the GaN-based semiconductor lasers LD1 through LD7 each have an output power of 300 mW, the optically-combined laser beam B has an output power of 1.89 W (=300 mW×0.9×7).

In the above laser apparatus, in order to ensure high coupling efficiency of the collimated laser beams B1 through B7 to the multimode optical fiber 30, it is necessary to fix the collimator-lens array 18 and the condensing lens 20 in such a manner that the optical axes of the collimator-lens array 18 and the condensing lens 20 are precisely parallel to the core axis of the multimode optical fiber 30 at the light-entrance end of the multimode optical fiber 30.

Assembly of Laser Apparatus

Hereinbelow, methods and structures for fixing the collimator-lens array 18 and the condensing lens 20 in the above-mentioned manner are explained in detail.

First, a method and a structure for fixing the collimator-lens array 18 by using the collimator-lens holder 44 and the like are explained below.

In this embodiment, the heat block 10 is made of AlN (aluminum nitride) and has a rectangular parallelepipedic shape, where AlN is superior in thermal conductivity and polishing workability. The bottom face of the heat block 10 is metalized by evaporation of gold, and fixed on the upper surface of the base plate 42 with low-melting-point solder or the like, where the base plate 42 is plated with gold. The base plate 42 is formed of, for example, CuW, CuMo, or Kovar, and fixed to the bottom surface of the package 40.

The heat block 10 is fixed in such a manner that the front face 10b of the heat block 10 is precisely perpendicular to the base plate 42. The front face 10b is mirror finished, and used as a mounting surface (on which the collimator-lens holder 44 is to be fixed) and as a reference surface (explained later).

The GaN-based semiconductor lasers LD1 through LD7 are mounted on the upper face 10a of the heat block 10 by using an AuSn alloy having a melting point of 280° C. (as a first brazing material). In the operation of mounting the GaN-based semiconductor lasers LD1 through LD7, the GaN-based semiconductor lasers LD1 through LD7 are first tacked to the upper face 10a of the heat block 10 one by one with a second brazing material, where the melting point of the second brazing material is adjusted at a first temperature which is lower than the melting point of the first brazing material of the AuSn alloy. After all the GaN-based semiconductor lasers LD1 through LD7 are tacked to the heat block 10, the assembly is heated to a second temperature which is higher than the melting point of the first brazing material (the AuSn alloy) in a reflow furnace so that the first brazing material is melted. Thus, the GaN-based semiconductor lasers LD1 through LD7 are fixed. For example, the first and second temperatures are set to 150° C. and 330° C., respectively.

When the GaN-based semiconductor lasers LD1 through LD7 are fixed as above, the temperature of the first brazing material deposited on the areas on which semiconductor lasers are not yet mounted does not exceed its melting point. Therefore, it is possible to prevent oxidation of the first brazing material, and realize stable mounting with high precision (e.g., approximately ±0.1 micrometers).

The near-end portion of the multimode optical fiber 30 on the light-entrance side is fixed to the package 40 by hermetically fixing the ferrule 31 which holds the near-end portion of the multimode optical fiber 30, to a sidewall of the package 40. At this time, the multimode optical fiber 30 is fixed in such a manner that the core axis of the near-end portion of the multimode optical fiber 30 is precisely perpendicular to the front face 10b of the heat block 10.

Figure 4:
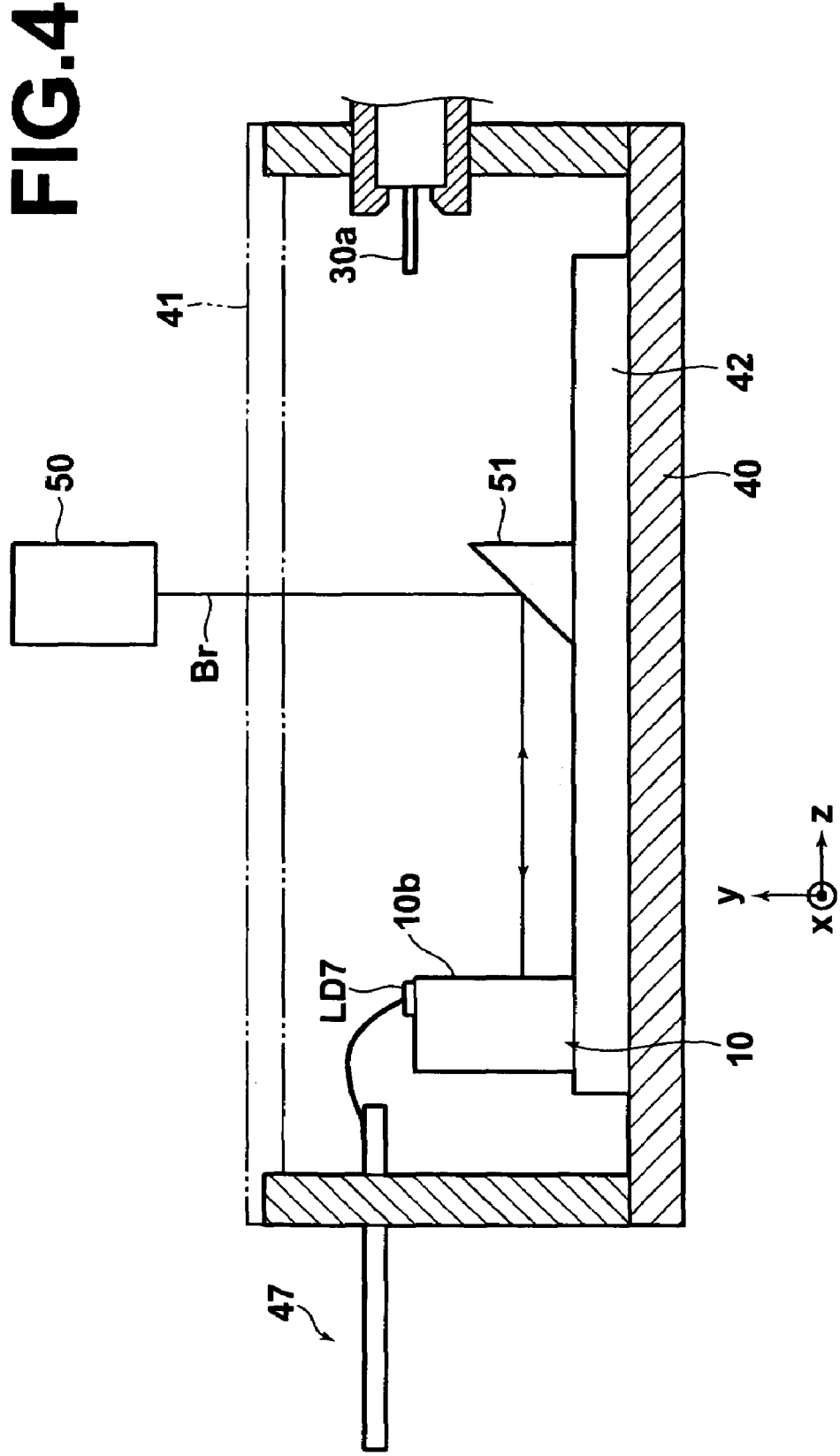
FIG. 4 is a first diagram for explaining a method for assembling the laser apparatus.

Next, before adhesively fixing the collimator-lens holder 44, the angle between the front face 10b (as the mounting surface and the reference surface of the heat block 10) and a reference direction is measured by using the laser autocollimator 50 and the mirror 51 as illustrated in FIG. 4, where the mirror 51 is placed on the base plate 42. According to the present embodiment, the propagation direction of a laser beam Br emitted from the laser autocollimator 50 is changed by 90 degrees by reflection by the mirror 51 so that the laser beam Br is perpendicularly incident on the front face 10b of the heat block 10. In this example, the propagation direction z of the laser beam Br after the reflection by the mirror 51 is the reference direction.

The laser autocollimator 50 receives the laser beam Br which is reflected at the front face 10b and is again reflected by the mirror 51 toward the laser autocollimator 50, and measures the angle which the front face 10b makes with the reference direction. This angle is determined by inclination angles θx and θy around the x- and y-axes, which are perpendicular to the reference direction z and to each other. In the example of FIG. 4, the y direction is identical to the propagation direction of the laser beam Br emitted from the laser autocollimator 50. For example, when the front face 10b of the heat block 10 is precisely perpendicular to the reference direction z, both the inclination angles θx and θy are zero. The measured inclination angles θx and θy are recorded on a recording sheet or the like, or stored in a storage.

Figure 5:
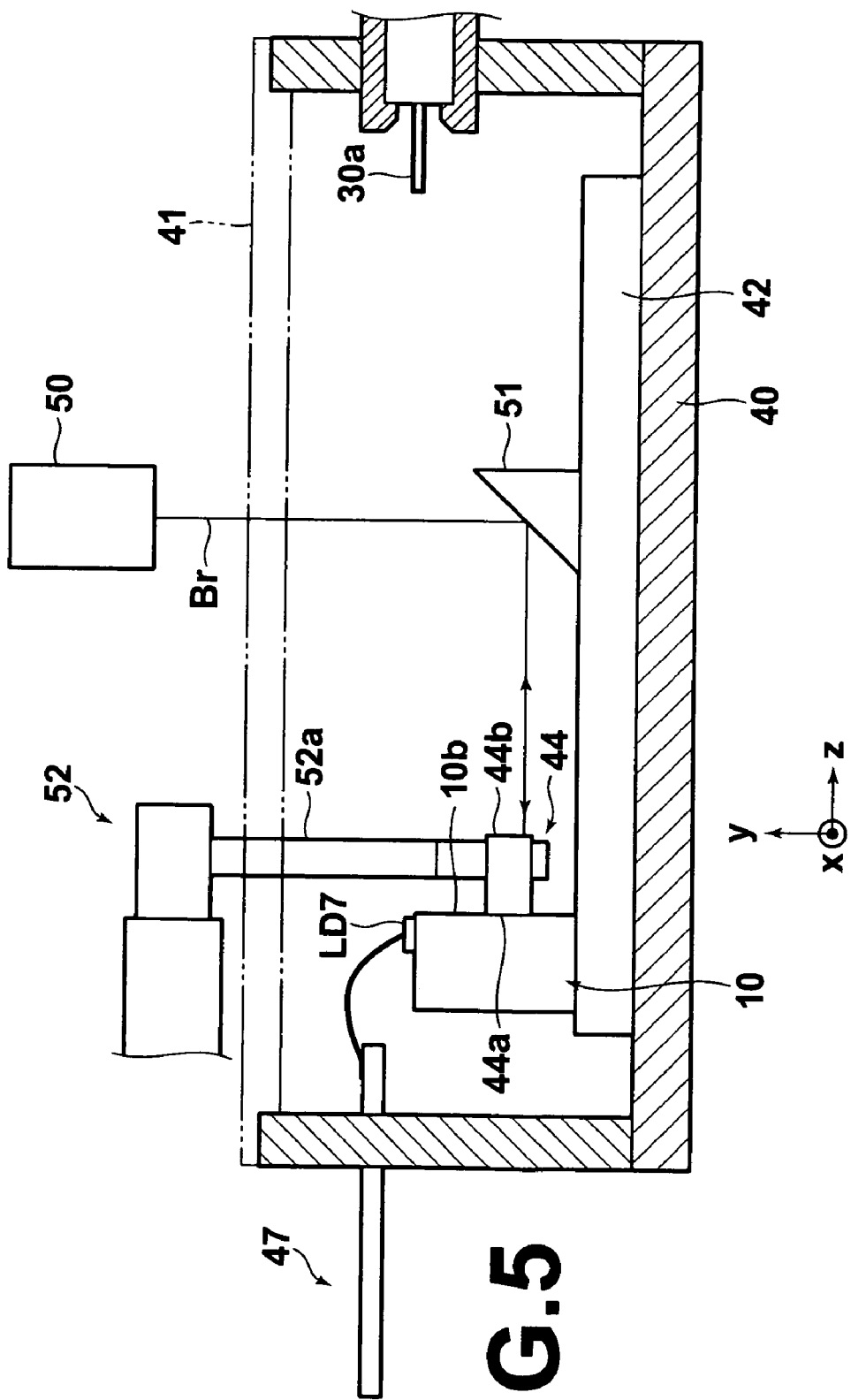
FIG. 5 is a second diagram for explaining the method for assembling the laser apparatus.

Next, the collimator-lens holder 44 is held by using a mechanical hand 52 (having a holding portion 52a which holds the collimator-lens holder 44) in a position in which a rear face 44a (as an adhesion surface) of the collimator-lens holder 44 lightly touches the front face 10b of the heat block 10 as illustrated in FIG. 5. For example, the mechanical hand 52 is a six-axis type, which has six-axis freedom in parallel translation in the directions of three axes and rotations on the three axes. It is possible to maintain the force which makes the collimator-lens holder 44 touch the front face 10b, at a predetermined level, for example, by using a load cell or the like, which is built in the mechanical hand 52.

In addition, while the collimator-lens holder 44 is held as above, the angle which a front face 44b (as a reference surface) of the collimator-lens holder 44 makes with the reference direction z is continuously measured in a similar manner to the aforementioned measurement of the angle between the front face 10b and the reference direction z. The angle between the front face 44b and the reference direction z is also determined by the inclination angles θx and θy.

In the operation of holding the collimator-lens holder 44, the mechanical hand 52 is controlled so that the continuously measured inclination angles θx and θy of the front face 44b respectively coincide with the inclination angles θx and θy of the front face 10b, and the collimator-lens holder 44 is located at a predetermined position in each of the x- and y-directions. When the collimator-lens holder 44 reaches the desired position, the movement of the mechanical hand 52 is stopped, and spots of adhesive are deposited in the gap between the front face 10b of the heat block 10 and the rear face 44a of the collimator-lens holder 44. Thus, when the spots of adhesive are cured, the collimator-lens holder 44 is adhesively fixed to the front face 10b.

In order to place the collimator-lens holder 44 at the predetermined position in each of the x- and y-directions, it is possible to determine the position of the collimator-lens holder 44 in each of the x- and y-directions by making the rear face 44a of the collimator-lens holder 44 slide on the front face 10b of the heat block 10. Therefore, the operation of placing the collimator-lens holder 44 at the predetermined position in each of the x- and y-directions is not difficult.

The collimator-lens holder 44 is formed so that the rear face 44a and the front face 44b are parallel with the high precision of approximately ±15". Such high precision in the parallelism between the rear face 44a and the front face 44b can be readily realized by polishing these faces. In this case, when the inclination angles θx and θy of the front face 44b of the collimator-lens holder 44 respectively coincide with the inclination angles θx and θy of the front face 10b of the heat block 10, the rear face 44a of the collimator-lens holder 44 is parallel with the front face 10b. Therefore, when the collimator-lens holder 44 is adhesively fixed to the front face 10b while maintaining the position in which the inclination angles θx and θy of the front face 44b of the collimator-lens holder 44 respectively coincide with the inclination angles θx and θy of the front face 10b of the heat block 10, the rear face 44a of the fixed collimator-lens holder 44 becomes precisely parallel with the front face 10b of the heat block 10.

In addition, in the above operation for adhesively fixing the collimator-lens holder 44, the mechanical hand 52 is further controlled on the basis of the outer dimensions of the collimator-lens holder 44 so that the collimator-lens holder 44 reaches a predetermined angular position around the z-axis in which an upper face 44c of the collimator-lens holder 44 becomes parallel with the base plate 42. Thus, the upper face 44c of the fixed collimator-lens holder 44 becomes precisely parallel with the base plate 42. The outer dimensions of the collimator-lens holder 44 are precisely measured in advance.

The adhesive used in the above adhesively fixing is, for example, an ultraviolet-curable type. However, since the collimator-lens holder 44 is formed of glass which transmits ultraviolet light, the ultraviolet light for curing the adhesive can transmit through the collimator-lens holder 44, so that the adhesive can be sufficiently irradiated with the ultraviolet light.

Figure 6:
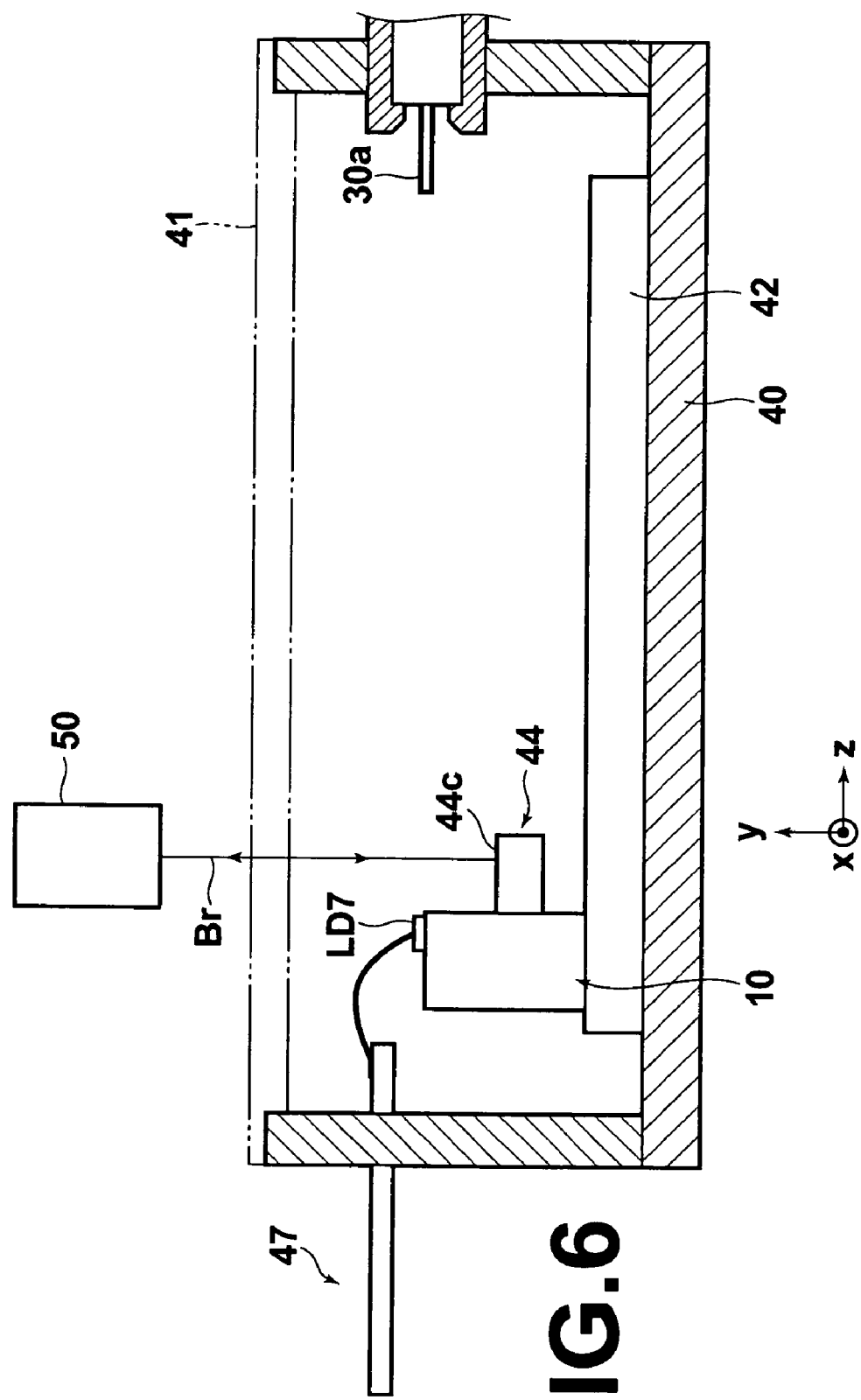
FIG. 6 is a third diagram for explaining the method for assembling the laser apparatus.

Thereafter, the mechanical hand 52 is controlled so that the holding portion 52a is removed from the package 40. Then, the angle which an upper face 44c of the fixed collimator-lens holder 44 makes with a reference direction y is measured by using the laser autocollimator 50 as illustrated in FIG. 6. In this measurement, the reference direction y is the propagation direction of the laser beam Br emitted downward from the laser autocollimator 50 as illustrated in FIG. 6, which is identical to the propagation direction of the laser beam Br emitted downward from the laser autocollimator 50 in the operations illustrated in FIGS. 4 and 5. At this time, the angle which the upper face 44c of the collimator-lens holder 44 makes with the reference direction y is determined by the inclination angles φx and φz around the x- and z-axes. For example, when the upper face 44c of the collimator-lens holder 44 is precisely perpendicular to the reference direction y, the inclination angles φx and φz are zero. The measured inclination angles φx and φz are recorded on a recording sheet or the like, or stored in a storage.

Figure 7:
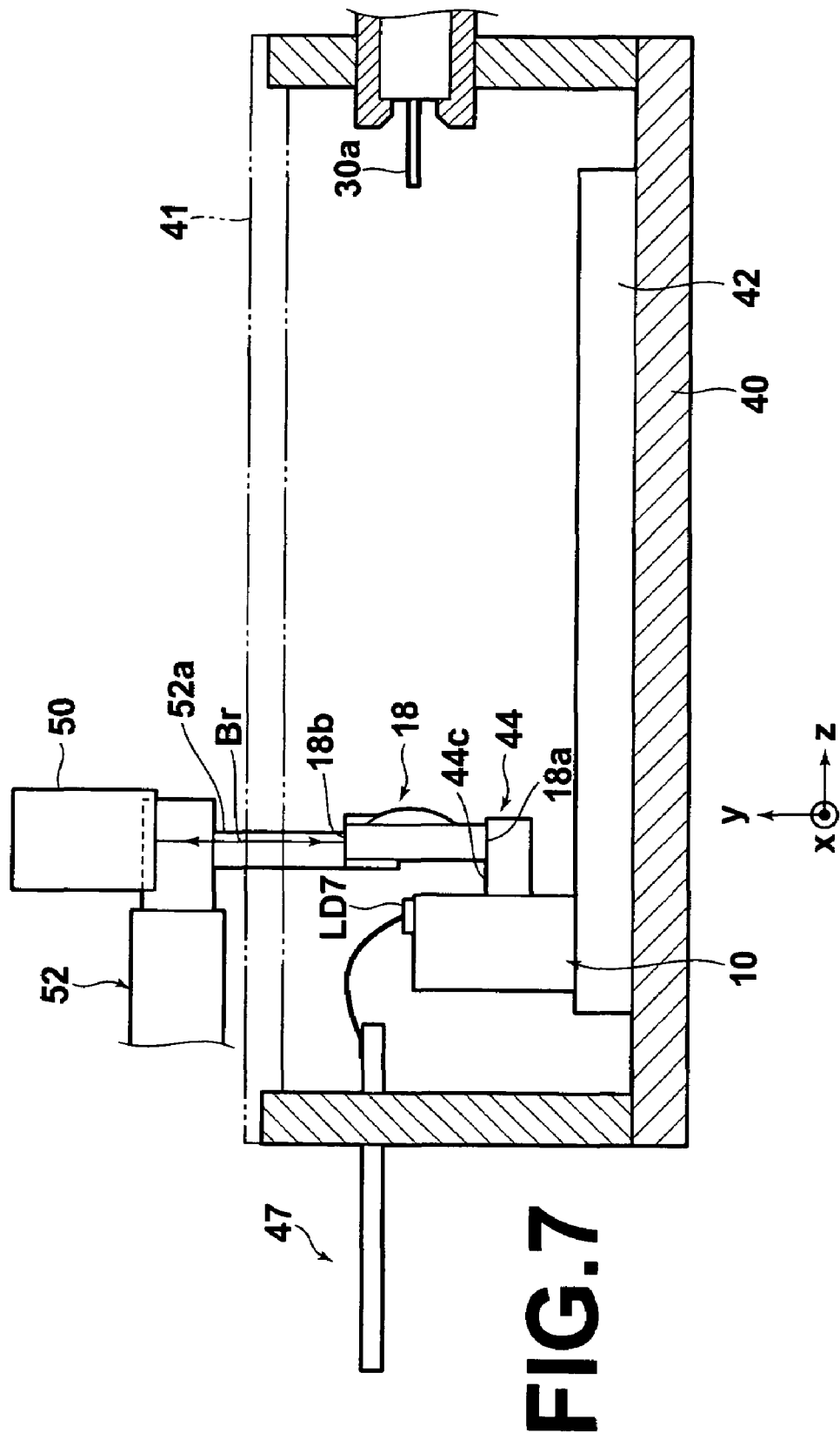
FIG. 7 is a fourth diagram for explaining the method for assembling the laser apparatus.

Next, the collimator-lens array 18 is held by using the mechanical hand 52 in a position in which a lower face 18a (as an adhesion surface) of the collimator-lens array 18 lightly touches the upper face 44c of the collimator-lens holder 44 as illustrated in FIG. 7. While the collimator-lens array 18 is held as above, the angle which an upper face 18b (as a reference surface) of the collimator-lens array 18 makes with the reference direction y is continuously measured in a similar manner to the aforementioned measurement of the angle between the upper face 44c and the reference direction y, and the angle between the upper face 18b and the reference direction y is also determined by the inclination angles φx and φz.

In the operation of holding the collimator-lens array 18, the mechanical hand 52 is controlled so that the continuously measured inclination angles φx and φz of the upper face 18b respectively coincide with the inclination angles φx and φz of the upper face 44c, and the collimator-lens array 18 is located at a predetermined position in each of the x- and z-directions. When the collimator-lens array 18 reaches the desired position, the movement of the mechanical hand 52 is stopped, and spots of adhesive are deposited in the gap between the upper face 44c of the collimator-lens holder 44 and the lower face 18a of the collimator-lens array 18. Thus, when the spots of adhesive are cured, the collimator-lens array 18 is adhesively fixed to the upper face 44c.

In order to place the collimator-lens array 18 at the predetermined position in each of the x- and z-directions, it is possible to determine the position of the collimator-lens array 18 in each of the x- and z-directions by making the lower face 18a of the collimator-lens array 18 slide on the upper face 44c of the collimator-lens holder 44. Therefore, the operation of placing the collimator-lens array 18 at the predetermined position in each of the x- and z-directions is not difficult.

The collimator-lens array 18 is formed so that the lower face 18a and the upper face 18b are precisely parallel. In this case, when the inclination angles φx and φz of the upper face 18b of the collimator-lens array 18 respectively coincide with the inclination angles φx and φz of the upper face 44c of the collimator-lens holder 44, the lower face 18a of the collimator-lens array 18 is parallel with the upper face 44c. Therefore, when the collimator-lens array 18 is adhesively fixed to the upper face 44c while maintaining the position in which the inclination angles φx and φz of the upper face 18b of the collimator-lens array 18 respectively coincide with the inclination angles φx and φz of the upper face 44c of the collimator-lens holder 44, the lower face 18a of the fixed collimator-lens array 18 becomes precisely parallel with the upper face 44c of the collimator-lens holder 44.

In addition, in the above operation for adhesively fixing the collimator-lens array 18, the mechanical hand 52 is further controlled, for example, on the basis of the outer dimensions of the collimator-lens array 18 so that the collimator-lens array 18 reaches a predetermined angular position around the y-axis in which the optical axes of the collimator lenses 11 through 17 become parallel to the core axis of the near-end portion of the multimode optical fiber 30. Thus, the optical axes of the collimator lenses 11 through 17 in the fixed collimator-lens array 18 become parallel to the core axis of the near-end portion of the multimode optical fiber 30.

However, it is impossible to achieve precise alignment between faces of members by only setting the angular position of the collimator-lens array 18 around the y-axis or the angular position of the collimator-lens holder 44 around the z-axis by use of the mechanical hand 52 as explained above. Therefore, according to the present invention, the reference surfaces are used in alignment between the faces of members.

When the collimator-lens array 18 is formed by high-precision molding, it is possible to achieve the high precision of approximately ±15" in the parallelism between the lower face 18a and the upper face 18b. Therefore, when the upper face 18b is used as a reference surface in the angle measurement, it is possible to achieve the high precision of approximately ±30" in the parallelism between the lower face 18a of the collimator-lens array 18 and the upper face 44c of the collimator-lens holder 44. In addition, it is also possible to make the lower face 18a and the upper face 18b parallel to the direction along which the collimator lenses 11 through 17 are arrayed, with the high precision of approximately ±15".

For example, the adhesive used in the adhesive fixing of the collimator-lens array 18 is also an ultraviolet-curable type. However, since the collimator-lens array 18 (as well as the collimator-lens holder 44) is formed of glass which transmits ultraviolet light, the ultraviolet light for curing the adhesive can transmit through the collimator-lens array 18 and the collimator-lens holder 44, so that the adhesive can be sufficiently irradiated with the ultraviolet light.

When the collimator-lens holder 44 and the collimator-lens array 18 are adhesively fixed to the heat block 10 and the collimator-lens holder 44, respectively, as explained above, the optical axes of the collimator lenses 11 through 17 become parallel to the core axis of the near-end portion of the multimode optical fiber 30 with high precision in the fixed structure.

In the laser apparatus explained above, the heat block 10 and the collimator-lens holder 44 constitute the aforementioned fixing structure in the first aspect of the present invention.

Referring back to FIG. 2, a method and a structure for fixing the condensing lens 20 by using the condensing-lens holder 46 and the like are explained below.

In this embodiment, the mount 45 (for holding the condensing-lens holder 46) is made of AlN (aluminum nitride) and has a rectangular parallelepipedic shape as the heat block 10. The lower face of the mount 45 is metalized by evaporation of gold, and fixed on the upper surface of the base plate 42 with low-melting-point solder or the like. As mentioned before, the base plate 42 is plated with gold. At this time, the mount 45 is fixed in such a manner that the front face 45a of the mount 45 is parallel to the front face 10b of the heat block 10. In order to realize this arrangement, it is possible to use the aforementioned method which is used for fixing the collimator-lens holder 44 to the front face 10b as illustrated in FIG. 5, and in which the laser autocollimator 50 and the mechanical hand 52 are used.

After the mount 45 is fixed as above, the condensing-lens holder 46 is adhesively fixed to the mount 45, and then the condensing lens 20 is adhesively fixed on an upper face 46c of the condensing-lens holder 46. The condensing-lens holder 46 is formed of, for example, ultraviolet-light-transparent glass, and has a rectangular parallelepipedic shape. In order to adhesively fix the condensing-lens holder 46 to the front face 45a of the mount 45, it is possible to similarly use the aforementioned method which is used for adhesively fixing the collimator-lens holder 44 to the front face 10b of the heat block 10. In the operation for adhesively fixing the condensing-lens holder 46 to the mount 45, a front face 46b of the condensing-lens holder 46 is used as a reference surface, and a rear face 46a of the condensing-lens holder 46 becomes an adhesion surface. Thus, the condensing-lens holder 46 is adhesively fixed to the front face 45a in such a manner that the rear face 46a is precisely parallel to the front face 45a of the mount 45.

It is possible to form the condensing-lens holder 46 in such a manner that the rear face 46a and the front face 46b are parallel with the precision of approximately ±15". Such high precision can be realized by polishing the rear face 46a and the front face 46b.

Next, the condensing lens 20 is adhesively fixed on an upper face 46c of the condensing-lens holder 46, which is adhesively fixed to the mount 45 as above. As mentioned before, the condensing lens 20 has a shape elongated in the horizontal direction. In addition, the condensing lens 20 is formed in such a manner that a lower face 20a (to be used as an adhesion surface) and an upper face 20b (to be used as a reference surface) are precisely parallel. In order to adhesively fix the condensing lens 20 on the upper face 46c of the condensing-lens holder 46, it is possible to similarly use the aforementioned method which is used for adhesively fixing the collimator-lens array 18 on the upper face 44c of the collimator-lens holder 44. That is, the upper face 20b of the condensing lens 20 is used as the reference surface, and the lower face 20a (as the adhesion surface) of the condensing lens 20 is adhesively fixed to the upper face 46c of the condensing-lens holder 46 so that the lower face 20a of the condensing lens 20 becomes precisely parallel to the upper face 46c of the condensing-lens holder 46.

It is also possible to form the condensing lens 20 in such a manner that the lower face 20a and the upper face 20b are parallel with the precision of approximately ±15". Such high precision can be realized by polishing the lower face 20a and the upper face 20b. In addition, it is also possible to make the lower face 20a and the optical axis of the condensing lens 20 parallel with the precision of approximately ±15".

In the laser apparatus explained above, the mount 45 and the condensing-lens holder 46 constitute the aforementioned fixing structure in the first aspect of the present invention.

As explained above, the condensing lens 20 is fixed to the condensing-lens holder 46 so that the optical axis of the condensing lens 20 precisely coincides with the optical axis of the near-end portion of the multimode optical fiber 30. In addition, the collimator-lens array 18 is fixed so that the optical axes of the collimator lenses 11 through 17 are precisely parallel to the optical axis of the near-end portion of the multimode optical fiber 30. Therefore, high coupling efficiency of the laser beams B1 through B7 to the multimode optical fiber 30 is ensured.

In the laser apparatus according to the present embodiment, the fixing structure for the collimator-lens array 18 is constituted by the heat block 10 and the collimator-lens holder 44, where the heat block 10 has the front face 10b as a guide surface extending in the direction perpendicular to the core axis of the multimode optical fiber 30, and the collimator-lens holder 44 has the upper face 44c as a guide surface extending in the direction parallel to the core axis of the multimode optical fiber 30. Therefore, it is possible to easily adjust the position of the collimator-lens array 18 with respect to the core axis of the multimode optical fiber 30 by moving the collimator-lens holder 44 along the front face 10b of the heat block 10 in the direction perpendicular to the core axis of the multimode optical fiber 30, and moving the collimator-lens array 18 along the upper face 44c of the collimator-lens holder 44 in the direction parallel to the core axis of the multimode optical fiber 30, before fixing the collimator-lens array 18.

In addition, according to the present embodiment, the fixing structure for the condensing lens 20 is constituted by the mount 45 and the condensing-lens holder 46, where the mount 45 has the front face 45a as a guide surface extending in the direction perpendicular to the core axis of the multimode optical fiber 30, and the condensing-lens holder 46 has the upper face 46c as a guide surface extending in the direction parallel to the core axis of the multimode optical fiber 30. Therefore, it is possible to easily adjust the position of the condensing lens 20 with respect to the core axis of the multimode optical fiber 30 by moving the condensing-lens holder 46 along the front face 45a of the mount 45 in the direction perpendicular to the core axis of the multimode optical fiber 30, and moving the condensing lens 20 along the upper face 46c of the condensing-lens holder 46 in the direction parallel to the core axis of the multimode optical fiber 30, before fixing the condensing lens 20.

When the collimator-lens holder 44 is moved along the front face 10b of the heat block 10 in the aforementioned method for fixing the collimator-lens array 18, the collimator-lens array 18 is not actually moved, since the collimator-lens array 18 is fixed to the collimator-lens holder 44 after the collimator-lens holder 44 is fixed to the heat block 10. However, the final position of the collimator-lens array 18 in the direction perpendicular to the core axis of the multimode optical fiber 30 is determined by the fixed position of the collimator-lens holder 44. Alternatively, if the collimator-lens array 18 is fixed to the collimator-lens holder 44 before adjusting the position of the collimator-lens holder 44, the collimator-lens array 18 actually moves together with the collimator-lens holder 44 along the front face 10b of the heat block 10. Therefore, the front face 10b of the heat block 10, as well as the upper face 44c of the collimator-lens holder 44, can be deemed to be one of the at least one guide surface which the fixing structure in the laser apparatus according to the first aspect of the present invention has, and the heat block 10 and the collimator-lens holder 44 can be deemed to constitute the fixing structure. Alternatively, each of the heat block 10 and the collimator-lens holder 44 can also be deemed to constitute a fixing structure.

Similarly, the front face 45a of the mount 45, as well as the upper face 46c of the condensing-lens holder 46, can be deemed to be one of the at least one guide surface which the fixing structure in the laser apparatus according to the first aspect of the present invention has, and the mount 45 and the condensing-lens holder 46 can be deemed to constitute the fixing structure. Alternatively, each of the mount 45 and the condensing-lens holder 46 can also be deemed to constitute a fixing structure.

As explained above, it is possible to adjust the collimator-lens array 18 and the condensing lens 20 (which constitute the optical condensing system) at respectively optimum positions with respect to the core axis of the multimode optical fiber 30. Therefore, the multimode optical fiber 30 is merely required to be fixed to a sidewall of the package 40 through the ferrule 31. That is, it is unnecessary to provide a mechanism for positioning the optical fiber outside the package. Thus, it is possible to reduce the size of the laser apparatus.

As mentioned before, the ferrule 31 holding the multimode optical fiber 30 may be fixed to the package 40 with a brazing material. Alternatively, it is possible to use an adhesive or the like, instead of the brazing material. Further, it is possible to directly fix the multimode optical fiber 30 to the sidewall of the package 40 without the ferrule 31. For example, it is possible to integrally form a ferrule with the package 40 in such a manner that the integrally formed ferrule has a similar shape to the ferrule 31 illustrated in FIG. 2, and fix the multimode optical fiber 30 to the ferrule 31.

In the above explanations, the inclinations of the collimator-lens array 18 and the condensing lens 20 are measured during assembly by using the reference surfaces as explained above. Further, even after completion of the assembly, the inclinations of the collimator-lens array 18 and the condensing lens 20 can be measured by using the reference surfaces in order to determine whether the assembled laser apparatus is nondefective or defective. Furthermore, the inclinations of the collimator-lens array 18 and the condensing lens 20 can be measured by using the reference surfaces during reassembly which is performed after the assembled laser apparatus is disassembled.

Moreover, in order to realize satisfactory reflection of the laser beam Br and suppress scattering during the measurement with respect to the reference direction, it is desirable that the reference surfaces used in the measurement be mirror finished with an arithmetic average roughness (Ra) smaller than 0.08 micrometers. In the present embodiment, such reference surfaces include the front face 10b of the heat block 10, the front face 44b and the upper face 44c of the collimator-lens holder 44, the upper face 18b of the collimator-lens array 18, the front face 45a of the mount 45, the front face 46b and the upper face 46c of the condensing-lens holder 46, and the upper face 20b of the condensing lens 20. When the reference surfaces are finished as above, it is possible to measure the angles with respect to the reference direction with the precision of approximately ±5".

On the other hand, in order to realize satisfactory penetration of the adhesive into the gaps between the adhesion surfaces and the reference surfaces, it is desirable that the adhesion surfaces to be adhered to the reference surfaces be rougher than the reference surfaces. In the present embodiment, such adhesion surfaces include the rear face 44a of the collimator-lens holder 44, the lower face 18a of the collimator-lens array 18, the rear face 46a of the condensing-lens holder 46, and the lower face 20a of the condensing lens 20. For example, when the reference surfaces are mirror finished with an arithmetic average roughness (Ra) smaller than 0.08 micrometers, it is desirable that the adhesion surfaces to be adhered to such reference surfaces have an arithmetic average roughness (Ra) from 0.15 to 0.35 micrometers. The arithmetic average roughness (Ra) can be measured, for example, by using a stylus-type roughness measurement device.

Although the reference surface in each fixing member such as the heat block 10 or the mount 45 is set parallel to the mounting surfaces in the fixing member in the above embodiment, alternatively, it is possible to set a reference surface in each fixing member so as to form a predetermined angle (e.g., 90 degrees) with a mounting surface in the fixing member corresponding to the reference surface. Similarly, it is possible to set each reference surface in each attachment part such as the collimator-lens holder 44 or the condensing-lens holder 46 so as to form a predetermined angle (e.g., 90 degrees) with an adhesion surface in the attachment part corresponding to the reference surface.

Temperature variations occurring during use or storage of the laser apparatus can produce thermal stress in a portion of the collimator-lens holder 44 at which the collimator-lens holder 44 is adhered to the heat block 10. In order to reduce such thermal stress, it is desirable that the collimator-lens holder 44 be formed of glass having a linear expansion coefficient close to the linear expansion coefficient of AlN, of which the heat block 10 is formed. Similarly, it is desirable that the collimator-lens array 18 be formed of glass having a linear expansion coefficient close to the linear expansion coefficient of the glass of which the collimator-lens holder 44 is formed. For the same reason, it is desirable that the condensing-lens holder 46 be formed of glass having a linear expansion coefficient close to the linear expansion coefficient of AlN, of which the mount 45 is formed, and the condensing lens 20 be formed of glass having a linear expansion coefficient close to the linear expansion coefficient of the glass of which the condensing-lens holder 46 is formed.

Although the heat block 10 and the mount 45 are formed of AlN in the above embodiment, it is also preferable to form the heat block 10 and the mount 45 of copper or a copper alloy. Further, it is possible to integrally form the heat block 10 and the mount 45.

A combined laser apparatus comprising a single lens which has the functions of both of the collimator-lens array and the condensing lens is disclosed, for example, in U.S. Pat. No. 6,995,912 referred to before. Although the collimator-lens array 18 and the condensing lens 20 are separately formed in the above embodiment, the present invention can also be applied to the combined laser apparatus in which the functions of both of the collimator-lens array and the condensing lens are realized by a single lens.

Although the present invention is applied to a combined laser apparatus in the above embodiment, the present invention can also be applied to laser apparatuses in which a single laser beam emitted from a semiconductor laser is condensed and coupled to an optical fiber.

Installation Structure

Hereinbelow, an installation structure for installing a laser apparatus according to an embodiment of the present invention is explained.

Figure 8:
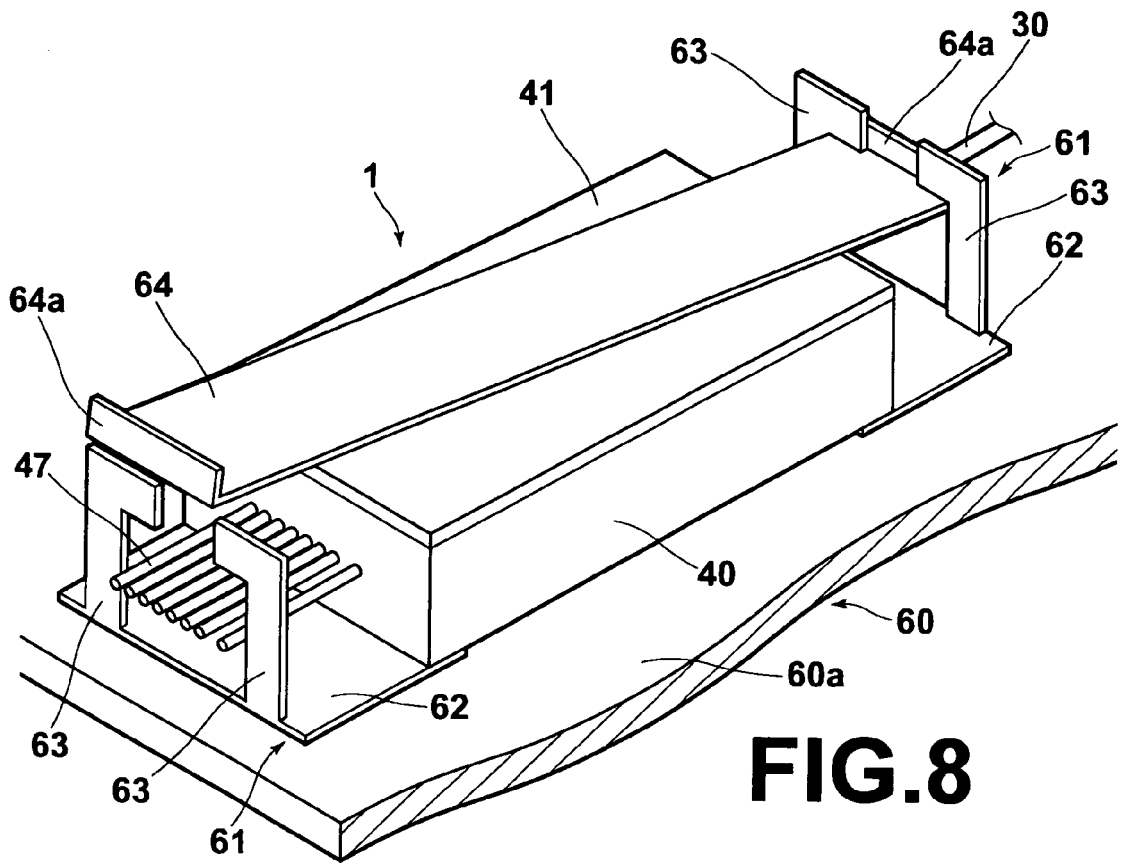
FIG. 8 is a schematic view of an installation structure according to an embodiment of the present invention.
Figure 9:
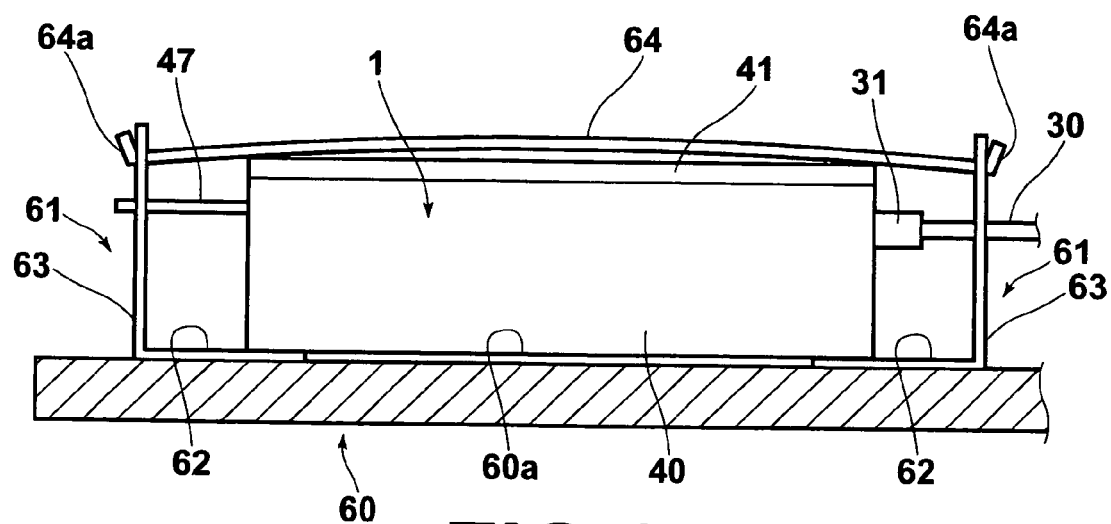
FIG. 9 is a side view of the installation structure of FIG. 8.

FIGS. 8 and 9 are schematic and side views of the installation structure according to an embodiment of the present invention. The installation structure illustrated in FIGS. 8 and 9 are provided for installing the combined laser apparatus illustrated in FIGS. 1 to 3 in a system which uses the combined laser apparatus. Hereinafter, this system is referred to as a laser-using system. In FIGS. 8 and 9, the combined laser apparatus is indicated by the reference "1." In the example of FIGS. 8 and 9, the combined laser apparatus 1 is mounted on a planar temperature controller 60, which is directly or indirectly fixed to a main body of the laser-using system. The temperature controller 60 is provided for maintaining the entire combined laser apparatus 1 at a predetermined temperature, and realized by, for example, a cold side of a Peltier element.

In addition, the temperature controller 60 is a package-mounting member, on which the package 40 is mounted, and the upper surface 60a of the temperature controller 60 is the mounting surface. A pair of fittings 61 are arranged a predetermined distance apart, and fixed on the upper surface 60a. As illustrated in FIGS. 8 and 9, each of the fittings 61 is constituted by a bottom plate 62 fixed on the mounting surface 60a and a pair of engagement portions 63. Each of the engagement portions 63 is approximately L-shaped and protrudes upward from the bottom plate 62. Each pair of engagement portions 63 is arranged so that one end of a plate spring 64 can be engaged with the pair of engagement portions 63. The plate spring 64 is an elastic member, and each end of the plate spring 64 is bent upward so as to form a bent portion 64a. The combined laser apparatus 1 is placed between the pair of fittings 61, the plate spring 64 is placed over the combined laser apparatus 1, and the bent portion 64a at each end of the plate spring 64 is engaged with one of the two pairs of the engagement portions 63. In this arrangement, the plate spring 64 is elastically bent into an upward convex shape, so that the plate spring 64 elastically presses the combined laser apparatus 1 placed under the plate spring 64, against the mounting surface 60a (specifically, through the cover 41). Thus, the combined laser apparatus 1 can be mounted on the temperature controller 60.

As explained before, in the combined laser apparatus 1, the construction for fixing the multimode optical fiber 30 is simplified by simply fixing the multimode optical fiber 30 to the sidewall of the package 40. However, if the optical fiber 30 in such a construction is prone to displacement, the precision in the fixed position of the optical condensing system becomes meaningless. Even when the displacement of the optical fiber 30 is approximately one micrometer, the coupling efficiency of the laser beams B1 through B7 to the optical fiber 30 and the power of the laser beam B outputted from the optical fiber 30 are lowered.

Nevertheless, in the installation structure according to the present embodiment, the package 40 of the combined laser apparatus 1 is elastically pressed against the temperature controller 60 by using the plate spring 64. Therefore, it is possible to effectively suppress the distortion which propagates through the package 40 to the portion at which the optical fiber 30 is fixed, in comparison with the conventional installation structure in which the bottom surface of the package is screw-fixed to a main body of a laser-using system. Since the installation structure as illustrated in FIGS. 8 and 9 is used, it is possible to effectively prevent displacement of the optical fiber caused by the distortion occurring at the time of installation.

In the above installation structure according to the present embodiment, if a heat-insulating member is inserted between the temperature controller 60 and the package 40, the package 40 is prone to distortion caused by heat distortion of the heat-insulating member which occurs when the temperature changes. On the other hand, in the installation structure according to the present embodiment, the package 40 is placed in direct contact with the temperature controller 60 without insertion of a heat-insulating member. Therefore, it is possible to reliably prevent occurrence of the distortion of the package 40 caused by the heat distortion of the heat-insulating member, and lowering of the coupling efficiency of the laser beams B1 through B7 caused by displacement of the optical fiber 30 which is produced by the distortion of the package 40.

Although the plate spring 64 is used as the elastic member which presses the package 40 against the temperature controller 60 in the above installation structure, alternatively, it is possible to use other types of elastic members such as coiled springs.

This application is based upon and claims the benefits of priority from the Japanese patent application No. 2005-082179, the entire contents of which are incorporated herein by reference.

What is claimed is:

1. A laser apparatus comprising:
   one or more semiconductor lasers which emit one or more laser beams;
   an optical fiber;
   an optical condensing system which condenses said one or more laser beams emitted from said one or more semiconductor lasers, and makes the one or more laser beams enter said optical fiber from a light-entrance end of the optical fiber;
   a package which contains said optical condensing system and said one or more semiconductor lasers, and fixedly holds said optical fiber in such a manner that said light-entrance end faces said optical condensing system; and
   a fixing structure which is arranged between said optical condensing system and said package for fixing the whole or a part of the optical condensing system to the package, which has at least one guide surface extending in at least one of first and second directions respectively parallel and perpendicular to a core axis of the optical fiber at said light-entrance end, and which allows sliding movement of the whole or said part of the optical condensing system along the guide surface before fixing the whole or said part of the optical condensing system to the package,
   wherein said fixing structure comprises,
      a mount which has a holder-attachment surface perpendicular to said core axis, and is fixed to said package, and
      a holder which has an optical-system mounting surface arranged parallel to said core axis for mounting the whole or said part of the optical condensing system, and is fixed to said holder-attachment surface; and
   wherein the optical condensing system and the holder have respective reference surfaces each of which has an arithmetic average roughness Ra of less than 0.08 micrometers.

2. A laser apparatus according to claim 1, wherein said one or more semiconductor lasers emit a plurality of laser beams.

3. A laser apparatus according to claim 1, wherein said optical fiber is fixed to said package with one of a brazing material and an adhesive.

4. A laser apparatus according to claim 1, further comprising a ferrule which is arranged for fixing said optical fiber, and is integral with the package.

5. A laser apparatus according to claim 1, wherein said holder has a front face and a rear face which are parallel to each other with a precision of approximately ±15".

6. A laser apparatus according to claim 1, wherein the optical condensing system and said holder have respective adhesion surfaces that have an arithmetic average roughness Ra in the range of 0.15 to 0.35 micrometers.

7. A laser apparatus according to claim 1, wherein the holder is made of glass.

8. A laser apparatus according to claim 1, wherein said fixing structure has a first guide surface, extending in the direction of the core axis, and a second guide surface extending in the direction perpendicular to the direction of the core axis, said first and second guide surfaces being formed by different members.

9. A method for assembling a laser apparatus having,
   one or more semiconductor lasers which emit one or more laser beams,
   an optical fiber,
   an optical condensing system which condenses said one or more laser beams emitted from said one or more semiconductor lasers, and makes the one or more laser beams enter said optical fiber from a light-entrance end of the optical fiber,
   a package which contains said optical condensing system and said one or more semiconductor lasers, and fixedly holds said optical fiber in such a manner that said light-entrance end faces said optical condensing system, and
   a fixing structure which is arranged between said optical condensing system and said package for fixing the whole or a part of the optical condensing system to the package through the fixing structure, which has at least one guide surface extending in at least one of first and second directions respectively parallel and perpendicular to a core axis of the optical fiber at said light-entrance end, and which allows movement of the whole or said part of the optical condensing system along the at least one guide surface before fixing the whole or said part of the optical condensing system to the package,
   wherein said fixing structure comprises,
      a mount which has a holder-attachment surface perpendicular to said core axis, and is fixed to said package, and
      a holder which has an optical-system mounting surface arranged parallel to said core axis for mounting the whole or said part of the optical condensing system, and is fixed to said holder-attachment surface; and wherein the optical condensing system and the holder have respective reference surfaces each of which has an arithmetic average roughness Ra of less than 0.08 micrometers. said method comprising the steps of:

(a) fixing said optical fiber to said package;

(b) adjusting the whole or said part of the optical condensing system to a predetermined position with respect to said core axis by sliding the whole or said part of the optical condensing system along said at least one guide surface of said fixing structure; and (c) fixing the whole or said part of the optical condensing system to said fixing structure at said predetermined position.

10. A method for assembling a laser apparatus having, one or more semiconductor lasers which emit one or more laser beams, an optical fiber, an optical condensing system which condenses said one or more laser beams emitted from said one or more semiconductor lasers, and makes the one or more laser beams enter said optical fiber from a light-entrance end of the optical fiber, a package which contains said optical condensing system and said one or more semiconductor lasers, and fixedly holds said optical fiber in such a manner that said light-entrance end faces said optical condensing system, and a fixing structure including, a mount which has a holder-attachment surface perpendicular to said core axis, and is fixed to said package, and a holder which has an optical-system mounting surface arranged parallel to said core axis for mounting the whole or a part of the optical condensing system, and is fixed to said holder-attachment surface, wherein the optical condensing system and the holder have respective reference surfaces each of which has an arithmetic average roughness Ra of less than 0.08 micrometers.

said method comprising the steps of (a) fixing said optical fiber to said package;

(b) adjusting said holder to a first predetermined position in a first direction perpendicular to said core axis by sliding the holder on said holder-attachment surface of said mount fixed to said package;

(c) fixing said holder to said holder-attachment surface at said first predetermined position;

(d) adjusting the whole or said part of the optical condensing system to a second predetermined position in a second direction parallel to said core axis by sliding the whole or said part of the optical condensing system on said optical-system mounting surface of said holder fixed to said mount; and (e) fixing the whole or said part of the optical condensing system to said optical-system mounting surface at said second predetermined position.

11. An installation structure for installing a laser apparatus having a package, in a system using the laser apparatus and having a main body, comprising:

a package-mounting member having a mounting surface on which said package is placed, and being directly or indirectly fixed to said main body; and an elastic member elastically pressing said package against the mounting surface;

wherein said laser apparatus includes, one or more semiconductor lasers which emit one or more laser beams, an optical fiber, an optical condensing system which condenses said one or more laser beams emitted from said one or more semiconductor lasers, and makes the one or more laser beams enter said optical fiber from a light-entrance end of the optical fiber, said package which contains said optical condensing system and said one or more semiconductor lasers, and fixedly holds said optical fiber in such a manner that said light-entrance end faces said optical condensing system, and a fixing structure which is arranged between said optical condensing system and said package for fixing the whole or a part of the optical condensing system to the package through the fixing structure, which has at least one guide surface extending in at least one of first and second directions respectively parallel and perpendicular to a core axis of the optical fiber at said light-entrance end, and which allows sliding movement of the whole or said part of the optical condensing system along the at least one guide surface before fixing the whole or said part of the optical condensing system to the package, wherein said fixing structure comprises, a mount which has a holder-attachment surface perpendicular to said core axis, and is fixed to said package, and a holder which has an optical-system mounting surface arranged parallel to said core axis for mounting the whole or said part of the optical condensing system, and is fixed to said holder-attachment surface; and wherein the optical condensing system and the holder have respective reference surfaces each of which has an arithmetic average roughness Ra of less than 0.08 micrometers.

12. An installation structure according to claim 11, wherein said package-mounting member has a temperature-control function which realizes temperature control of said laser apparatus, and said package is placed in direct contact with said mounting surface without insertion of a heat-insulating member.

* * * * *